United States Patent
St-Laurent et al.

(10) Patent No.: US 10,419,325 B2
(45) Date of Patent: *Sep. 17, 2019

(54) SYSTEM AND METHOD FOR LOOPBACK AND NETWORK LOOP DETECTION AND ANALYSIS

(71) Applicant: Accedian Networks Inc., Saint-Laurent (CA)

(72) Inventors: Stephane St-Laurent, Roxboro (CA); Donald Stevenson, Kirkland (CA)

(73) Assignee: Accedian Networks Inc., Saint-Laurent, Quebec ( * ) Notice: Subject to any disclaimer, the term of this patent is extended or adjusted under 35 U.S.C. 154(b) by 0 days.

This patent is subject to a terminal disclaimer.

(21) Appl. No.: 16/032,366

(22) Filed: Jul. 11, 2018

(65) Prior Publication Data

US 2018/0324078 A1    Nov. 8, 2018

Related U.S. Application Data

(63) Continuation of application No. 15/493,275, filed on Apr. 21, 2017, now Pat. No. 10,038,620, which is a
(Continued)

(51) Int. Cl.
*H04L 12/26* (2006.01)
*H04L 1/24* (2006.01)
(Continued)

(52) U.S. Cl.
CPC ............ *H04L 43/50* (2013.01); *H04L 1/243* (2013.01); *H04L 12/4641* (2013.01);
(Continued)

(58) Field of Classification Search
CPC ..................................................... H04L 43/50
See application file for complete search history.

(56) References Cited

U.S. PATENT DOCUMENTS 6,463,037 B1 * 10/2002 Ooyoshi ............ H04L 43/0817
370/242
6,826,156 B1 * 11/2004 Sutton ..................... H04L 1/243
370/248
(Continued)

FOREIGN PATENT DOCUMENTS

WO    WO 2012/163233 A1    12/2012
WO    WO 2013/159450 A1    10/2013

*Primary Examiner* — Warner Wong
(74) *Attorney, Agent, or Firm* — Stratford Managers Corporation

(57) ABSTRACT

A method of determining the presence of a loopback in one or more networks comprises storing information related to a test instance; sending a loopback detection beacon (LPDB) containing information related to the test instance from a port on an originating device; monitoring the port for a predetermined time period to detect LPDBs arriving at the port during the predetermined time period; and determining whether a detected LPDB contains information corresponding to the stored information, to detect the presence of a loopback. The method may determine whether a detected loopback is a port loopback, a tunnel loopback or a service loopback. The stored information related to the test instance may be deleted if an LPDB arriving at the port and containing information corresponding to the stored information is not detected within the predetermined time period.

18 Claims, 15 Drawing Sheets

Related U.S. Application Data continuation of application No. 14/661,674, filed on Mar. 18, 2015, now Pat. No. 9,660,896.

(60) Provisional application No. 62/095,273, filed on Dec. 22, 2014, provisional application No. 62/045,965, filed on Sep. 4, 2014.

(51) Int. Cl.
   *H04L 12/24* (2006.01)
   *H04L 12/46* (2006.01)

(52) U.S. Cl.
   CPC .............. *H04L 41/12* (2013.01); *H04L 43/10* (2013.01); *H04L 43/16* (2013.01)

(56) References Cited

U.S. PATENT DOCUMENTS

| | | |
|---|---|---|
| 2004/0078483 A1 | 4/2004 | Simila |
| 2004/0143781 A1 | 7/2004 | DiMambro |
| 2011/0229123 A1* | 9/2011 | Li ....................... H04L 41/0668 398/5 |
| 2013/0229927 A1 | 9/2013 | Chouinard |
| 2014/0204768 A1 | 7/2014 | Chen |

* cited by examiner

SYSTEM AND METHOD FOR LOOPBACK AND NETWORK LOOP DETECTION AND ANALYSIS

CROSS-REFERENCE TO RELATED APPLICATIONS

This application is a continuation of U.S. patent application Ser. No. 15/493,275, filed Apr. 21, 2017, now allowed, which is a continuation of U.S. patent application Ser. No. 14/661,674, filed Mar. 18, 2015, now U.S. Pat. No. 9,660,896, which claims priority to U.S. Provisional Patent Application No. 62/095,273, filed on Dec. 22, 2014, and U.S. Provisional Patent Application No. 62/045,965, filed on Sep. 4, 2014, each of which is hereby incorporated by reference herein in its entirety.

FIELD OF THE INVENTION

The present disclosure relates to loopback and network loop detection in a network.

BRIEF SUMMARY

In accordance with one embodiment, a method of determining the presence of a loopback in one or more networks comprises storing information related to a test instance; sending a loopback detection beacon (LPDB) containing information related to the test instance from a port on an originating device; monitoring the port for a predetermined time period to detect LPDBs arriving at the port during the predetermined time period; and determining whether a detected LPDB contains information corresponding to the stored information, to detect the presence of a loopback. The method may determine whether a detected loopback is a port loopback, a tunnel loopback or a service loopback. The information related to the test instance in the LPDB may be in a protocol data unit (PDU). The stored information related to the test instance may be deleted if an LPDB arriving at the port and containing information corresponding to the stored information is not detected within the predetermined time period.

In one implementation, the LPDB includes a Virtual Local Area Network (VLAN) signature, and a detected loopback is determined to be a tunnel loopback if an LPDB arriving at the port includes a VLAN signature that matches a VLAN signature in an LPDB sent from the port. The method may determine whether a detected port loopback is a hard cable loopback or a facility loopback. The information in the LPDB may contain a time stamp, so that the difference between the time stamp and the arrival time of a detected LPDB can be used to determine whether a detected loopback is a hard cable loopback or a remote facility loopback. The detected loopback can be determined to be a hard cable loopback if the difference is smaller than a predetermined threshold, and determined to be a facility loopback if the difference is greater than the predetermined threshold.

In another implementation, the LPDB includes a Virtual Local Area Network (VLAN) signature that includes a Customer Service Specification (CSS) and a Network Service Specification (NSS), and a detected loopback is determined to be a service loopback if (1) the CSS of an LPDB.arriving at the port matches the CSS of an LPDB sent from the port, or (2) the NSS of an LPDB.arriving at the port matches the NSS of an LPDB sent from the port.

The monitoring and determining may be implemented on the originating device, or on a device or server separate from the originating device. Affected traffic may be discarded in response to the detection of a loopback. Future traffic may be blocked at the port in response to the detection of a loopback, and the blocking may be revertive or non-revertive. The LPDB may be restricted to one or more selected sections of the one or more networks. The LPDB may be generated using a software tool, and the software tool may be used to detect loopback based on the LPDB and/or to configure am NLDB.

In accordance with another embodiment, a method of determining the presence of a network loop comprises storing information related to a test instance; setting a time period related to the test instance; sending a network loop detection beacon (NLDB) containing information related to the test instance from a port on an originating device; monitoring the port for a predetermined time period to detect an NLDB arriving at the port during the predetermined time period; and determining whether a detected NLDB contains information corresponding to the stored information, to detect the presence of a network loop. In one implementation, the information related to the test instance includes a Customer Service Specification (CSS) and a Network Service Specification (NSS), and the method determines whether a detected NLDB is a network loop if the CSS and NSS of an NLDB arriving at the port match the CSS and NSS of an NLDB sent from the port. The originating device may be a network device. The NLDB may arrive at a second port on the originating device, and be forwarded to the port from which the NLDB was sent. An alarm may be reported if a network loop is detected. The NLDB may be generated or configured using a software tool, which may be used to detect the network loop.

In one implementation, traffic is either discarded or blocked if a network loop is detected. The blocking may be revertive or non-revertive.

BRIEF DESCRIPTION OF THE DRAWINGS

The foregoing and other advantages of the disclosure will become apparent upon reading the following detailed description and upon reference to the drawings.

Figure 1A:
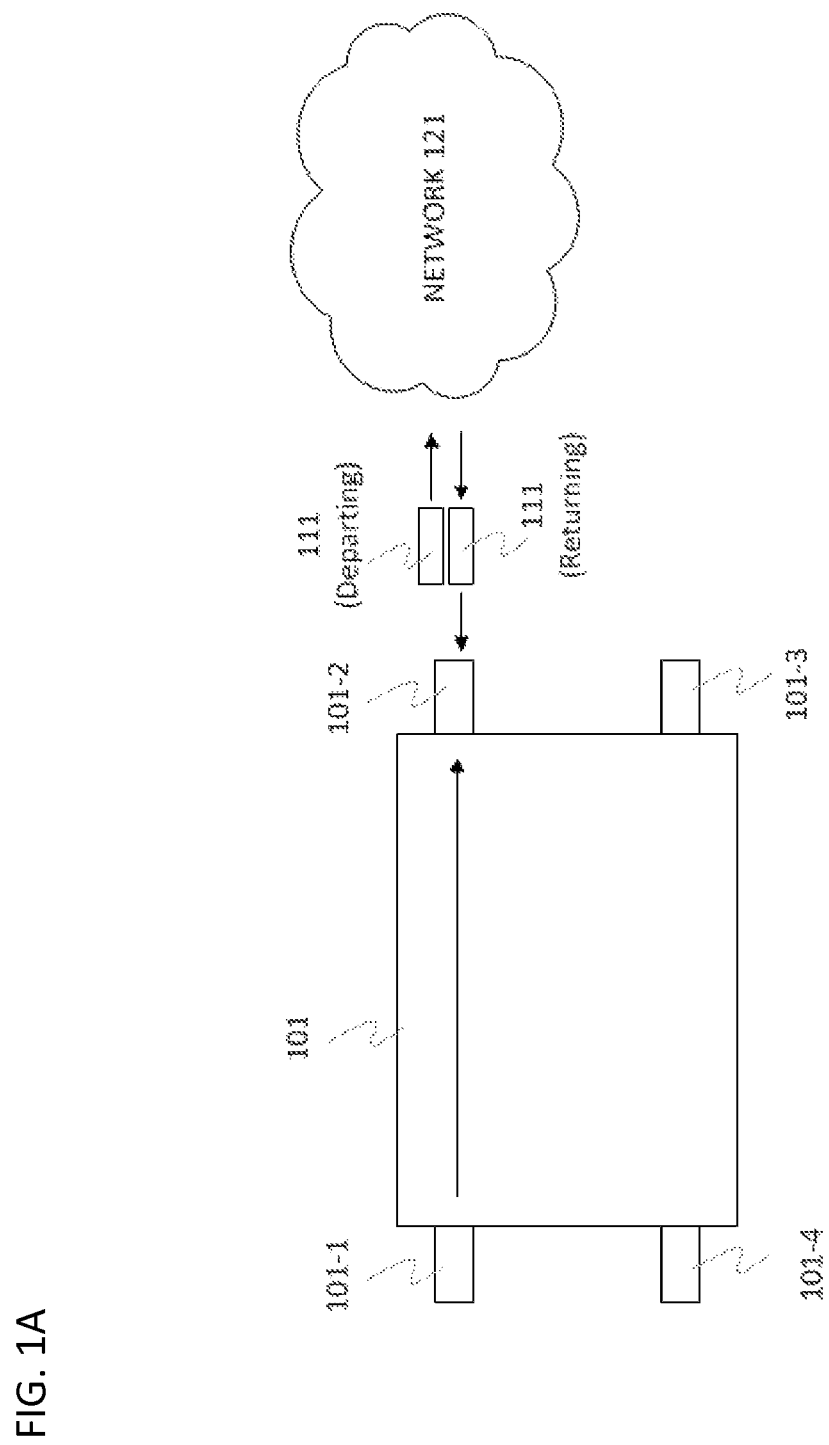
FIG. 1A is a diagrammatic illustration of a loopback.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

A loopback occurs when a frame, such as an Ethernet frame, returns to the same port of the Network Device (ND) that it departed from. A ND can be a Network Interface Device (NID) or any switching or routing device with internal connectivity. The port can be a user network interface (UNI), External Network to Network Interface (ENNI) or an Internal Network to Network Interface (INNI). A network loop occurs when a frame returns to the same port of the ND that it departed from, via a different port and after being forwarded within the ND to the port that it departed from.

Figure 1B:
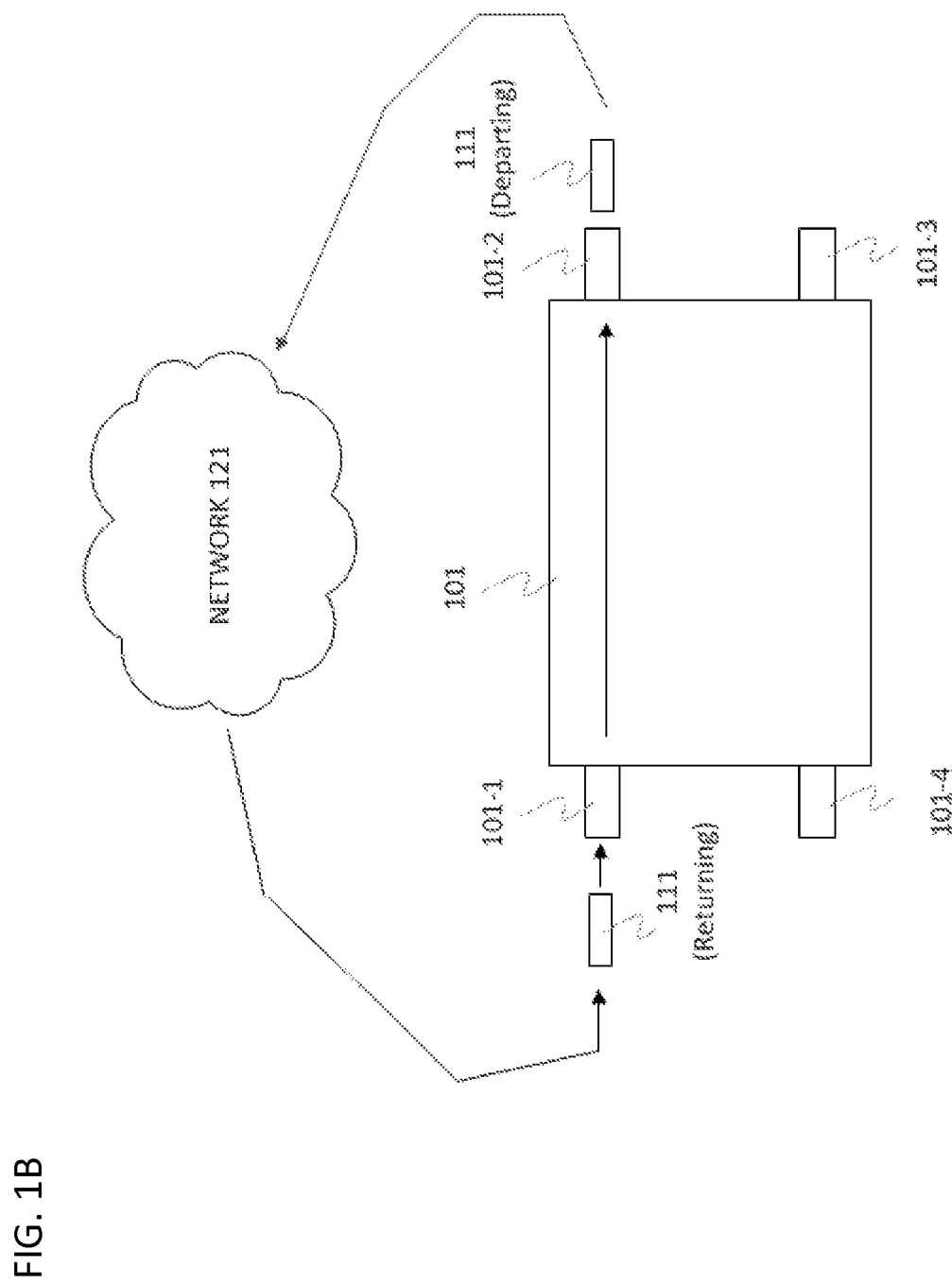
FIG. 1B is a diagrammatic illustration of a network loop.

Examples of a loopback and a network loop are shown in FIGS. 1A and 1B. ND 101 has ports 101-1, 101-2, 101-3 and 101-4. In FIG. 1A, loopback occurs when frame 111 departs from port 101-2 of ND 101 and returns to port 101-2 via network 121. A network loop occurs as shown in FIG. 1B when frame 111 departs from port 101-2 of ND 101 and returns to port 101-2 via network 121 by arriving at port 101-1, and being forwarded within ND 101 to port 101-2.

Different types of loopback are possible. These include, for example, port loopback, tunnel loopback or service loopback.

Figure 2:
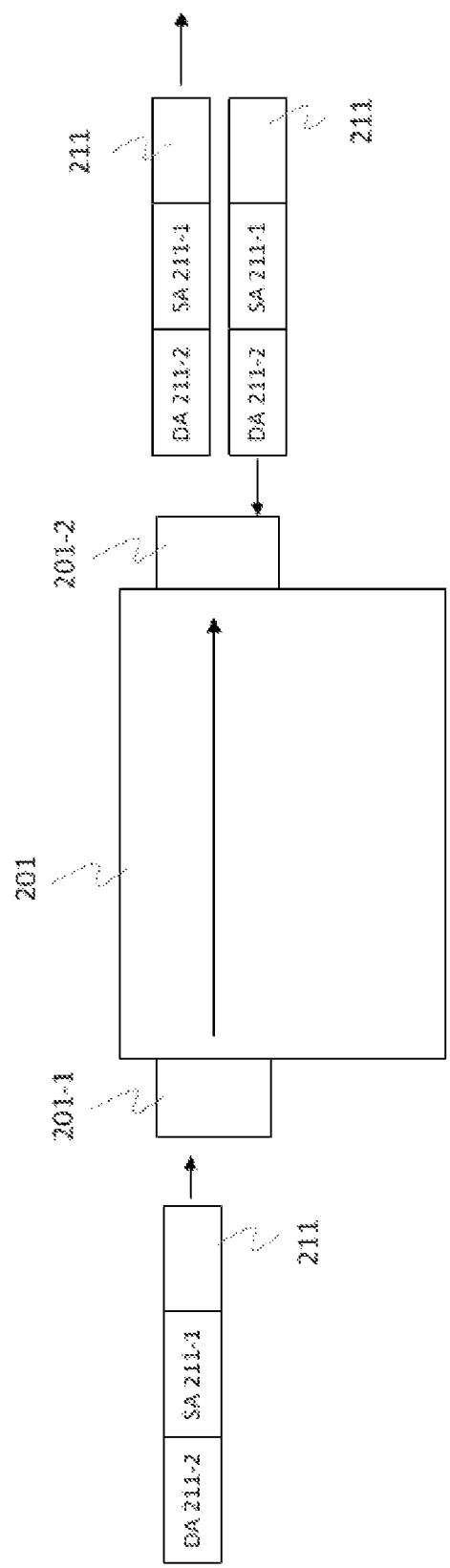
FIG. 2 is a diagrammatic illustration of port loopback that is a physical loopback.
Figure 3:
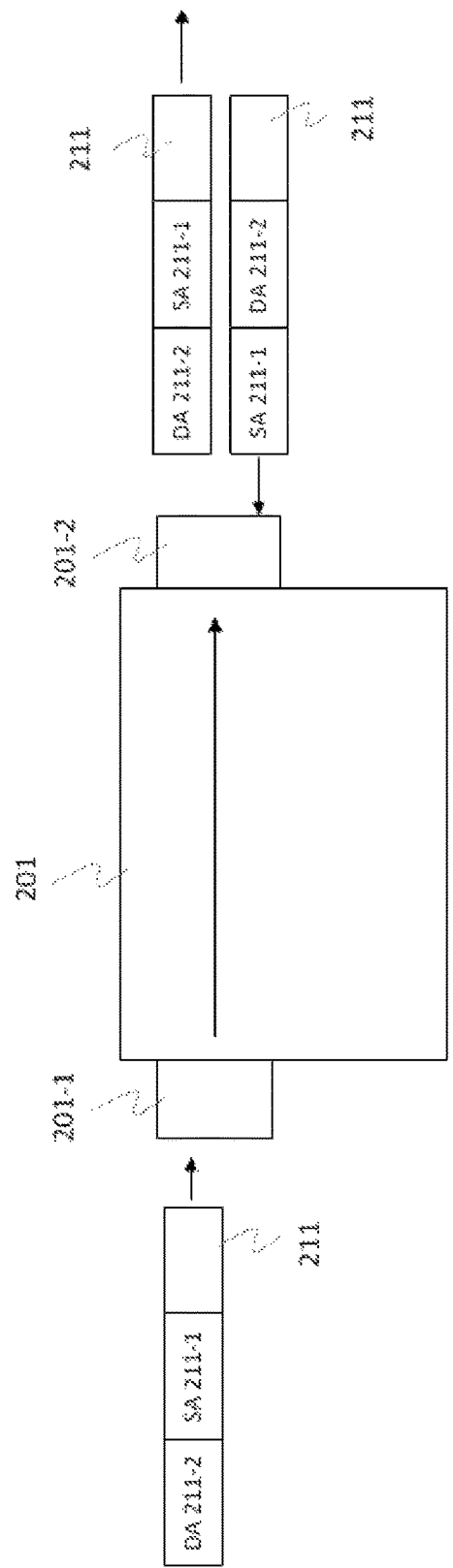
FIG. 3 is a diagrammatic illustration of a port loopback that is a logical loopback.

A port loopback, occurs if the frame returns to the same port as shown in, for example, FIGS. 2 and 3. One example of port loopback is physical loopback, as shown in FIG. 2. In FIG. 2, frame 211 enters ND 201 from port 201-1 and departs ND 201 from port 201-2. The frame then returns to port 201-2. Physical loopback results in frames being sent back without any change in the source address (SA) or destination address (DA) as shown in FIG. 2. In FIG. 2, SA 211-1 and DA 211-2 of frame 211 are not interchanged. A consequence of physical loopback is that a looped frame is broadcast back into the network in the frame flooding stage of the Media Access Control (MAC) learning. Another consequence of physical loopback is that the source MAC address is not learned correctly, since the same frame enters the ND from two different ports. For example, referring to FIG. 2, the same frame 211 enters the ND from port 201-1, and then again from port 201-2.

Another type of port loopback is logical loopback, as shown in FIG. 3. In FIG. 3, frame 211 departs ND 201 from port 201-2 and returns to port 201-2. However, SA 211-1 and DA 211-2 are interchanged.

Port loopback can arise because a hard loopback is set up directly to a port, otherwise known as hard cable loopback; or a facility loopback is set up either physically or logically.

Figure 4:
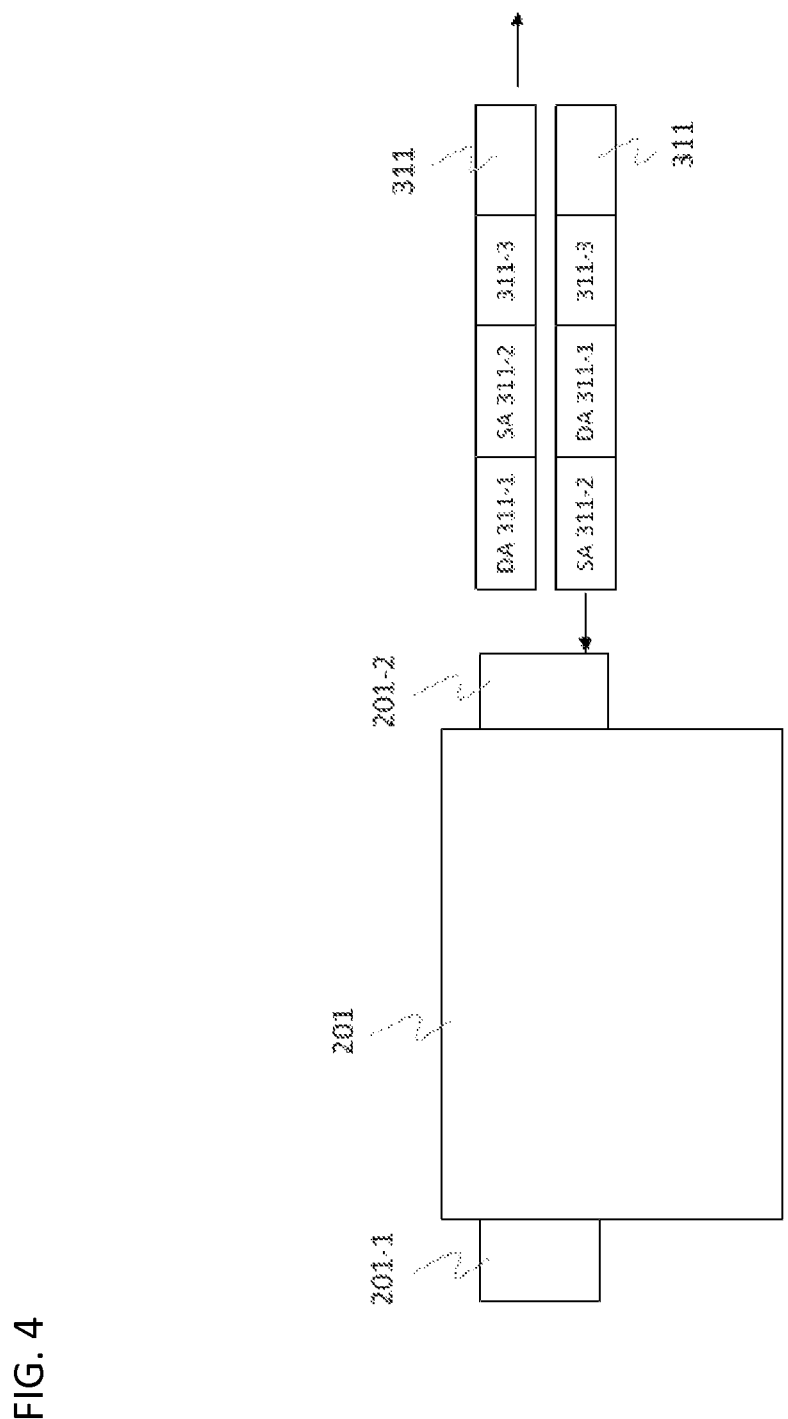
FIG. 4 is a diagrammatic illustration of a tunnel loopback.

FIG. 4 shows a tunnel loopback. In this case, a tunnel loopback occurs in the 802.1Q standard tunnel. A tunnel loopback occurs if a departing frame containing a VLAN signature returns to the same port with the same VLAN signature. For example, in FIG. 4, frame 311 with VLAN signature 311-3 returns to port 201-2 of ND 201 with the same VLAN signature 311-3 as the frame which was sent out.

Figure 5:
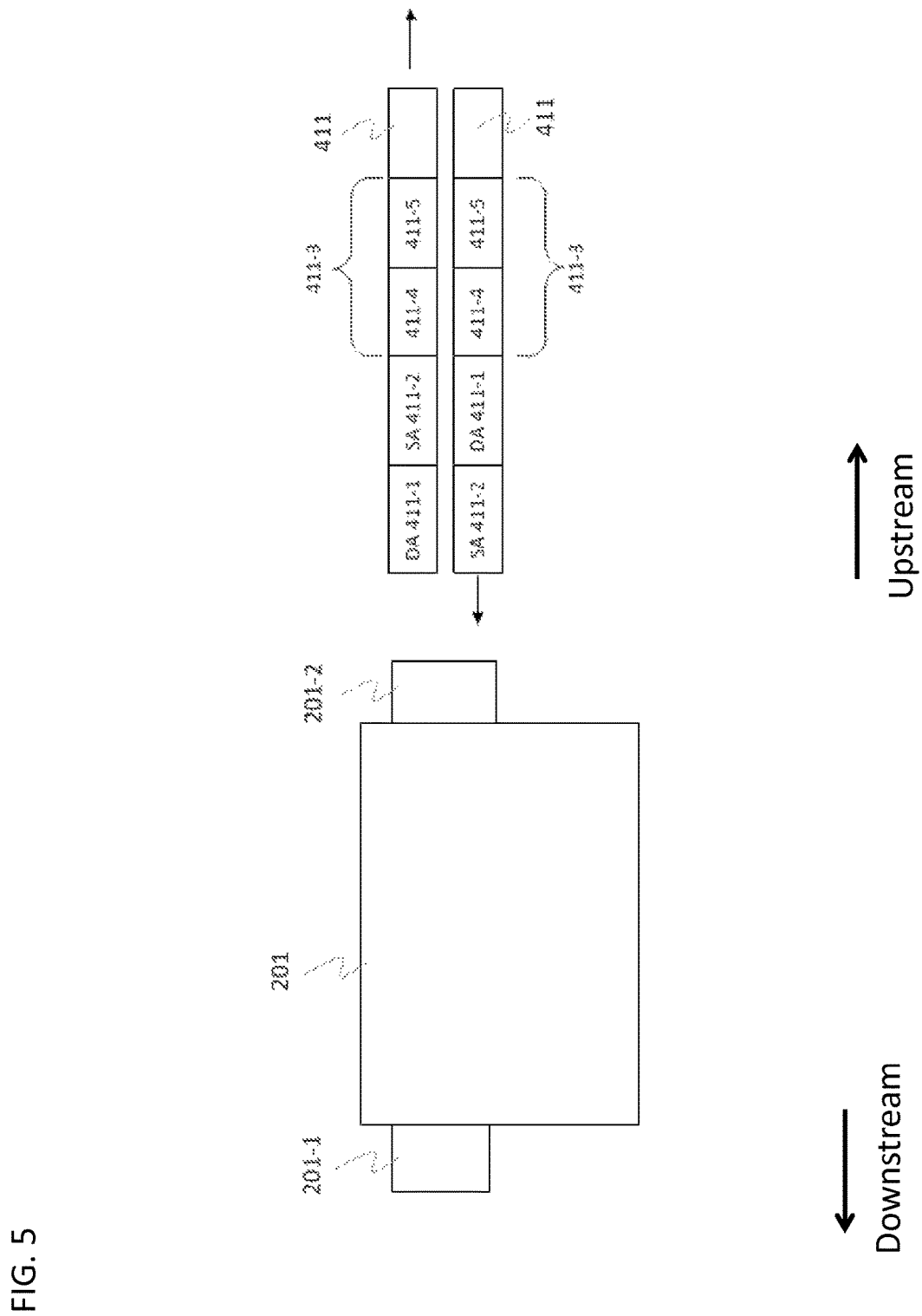
FIG. 5 is a diagrammatic illustration of an upstream service loopback.

FIG. 5 shows an example of an upstream service loopback. In FIG. 5, a departing frame 411 is sent with an associated VLAN signature 411-3 comprising a Customer Service Specification (CSS) 411-4 and a Network Service Specification (NSS) 411-5. The frame 411 is sent into the network from port 201-2 of ND 201, and a loopback occurs if the frame 411 is returned to the port 201-2 and the CSS of the returned frame matches the CSS of the frame which was sent out. A downstream service loopback is similar to the upstream service loopback but facing downstream from the ND. The upstream and downstream service loopback is generally associated to a provisioned rule.

Network loops occur when a physical loop is created in a network due to misconnection of cables or misconfiguration of switches.

Loopbacks and network loops may cause a number of issues in a network including loss of intended connectivity, interference with MAC address learning at switches, slowed traffic in the network because looped frames are broadcast back into the network thus increasing traffic and slowing down the network, and broadcast storms.

Therefore, there is a need for detection of loopbacks and network loops in a network, in order to locate the fault and remedy the problem in a timely manner without excessive disruption of the transmission of data in the network.

In one embodiment, a loopback detection beacon (LPDB) is used to detect loopbacks. The LPDB may be a data frame with specific protocol data unit (PDU) information that is used to identify the LPDB.

Figure 6:
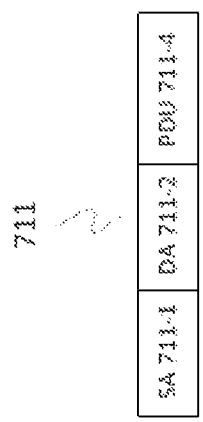
FIG. 6 is a diagrammatic illustration of a beacon used to detect a port loopback.

An exemplary embodiment to detect port loopback is shown in FIG. 6. LPDB 711 has SA 711-1, DA 711-2 and PDU 711-4. The DA 711-2 may be an unused MAC address. The LPDB is sent into the network via a port on an originating device, such as port 201-2 of ND 201.

Figure 7:
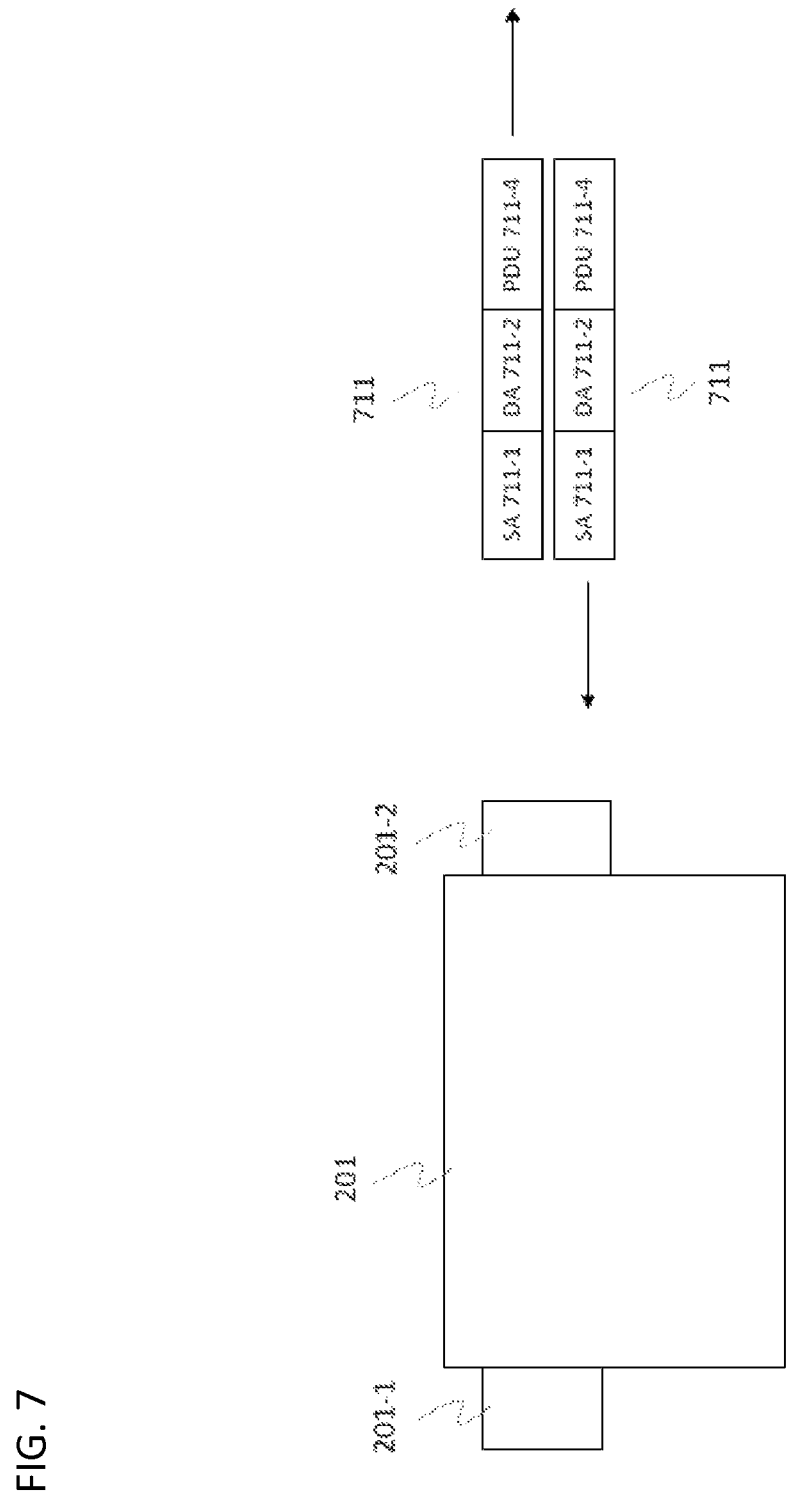
FIG. 7 is a diagrammatic illustration of the use of a beacon to detect a port loopback.

In one embodiment, an LPDB is used to detect port loopback. This is shown in FIG. 7. The LPDB 711 is sent via a port such as port 201-2 on a ND 201 and the originating port 201-2 is monitored. A loopback on port 201-2 is detected if the LPDB 711 is returned to port 201-2 and matches the LPDB sent out. A test instance is set up and information relating to the test instance is also stored within the ND, and a timer is set for the test instance. The timer value is generally fixed and programmed, but any other techniques to set the timer for a given test instance can be used. The PDU 711-4 includes information relating to the test instance taking place. When the frame returns to the ND, the information within PDU 711-4 is checked against the information relating to the test instance stored within the ND. If the two sets of information match, then a loopback is detected. When the timer expires for a given test instance, the information related to the test instance is removed. If the LPDB returns to the ND later, there is no match found and statistics are updated.

In a further embodiment, a timestamp associated with the LPDB is used to distinguish between hard cable loopback and remote facility loopback. If the LPDB returns, the timestamp is compared to the time. If the difference is smaller than a threshold (typically one transmission delay), then a hard cable loopback is detected, otherwise if the difference is larger, a remote facility loopback is detected.

Figure 8:
FIG. 8 is a diagrammatic illustration of a beacon used to detect a tunnel loopback.
Figure 9:
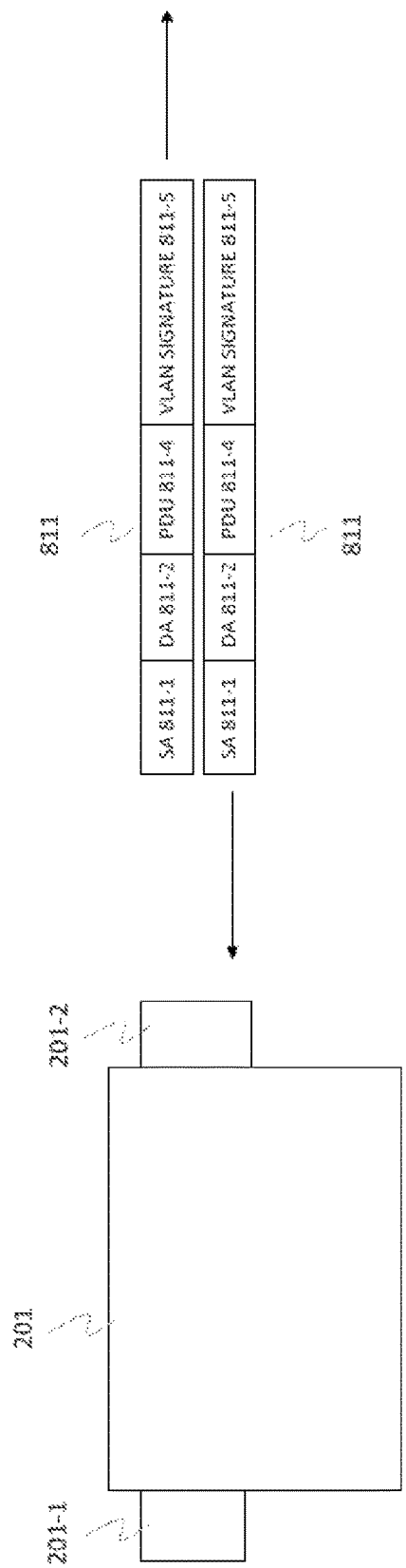
FIG. 9 is a diagrammatic illustration of the use of a beacon to detect a tunnel loopback.

In another embodiment, the LPDB is used to detect tunnel loopback. An exemplary LPDB 811 to detect a tunnel loopback is shown in FIG. 8 with SA 811-1, DA 811-2, PDU 811-4 and VLAN signature 811-5. In FIG. 9, LPDB 811 is sent via a port 201-2 on ND 201 toward a Virtual Local Area Network (VLAN) 903 associated with an 802.1Q standard tunnel. The departing port 201-2 of the ND 201 is monitored and a tunnel loopback is detected if the VLAN signature 811-5 of the returned LPDB matches that of the departing LPDB 811 at the originating port 201-2. The monitoring comprises storing information about the test instance, setting up a timer of a predetermined value and removing the information about the test instance when a match is detected or the timer expires.

Figure 10:
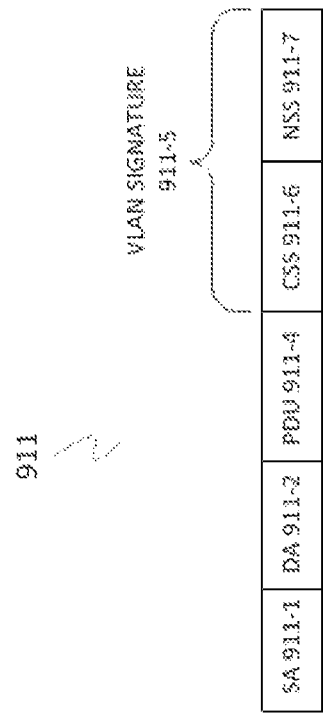
FIG. 10 is a diagrammatic illustration of a beacon used to detect a service loopback.

In another embodiment, the LPDB is used to detect service loopback. The LPDB includes information that uniquely identifies the customer network and is sent from a UNI in either an upstream direction or a downstream direction. An example LPDB 911 to detect service loopback is shown in FIG. 10. LPDB 911 comprises SA 911-1, DA 911-2, PDU 911-4 and VLAN signature 911-5. VLAN signature 911-5 further comprises unique identification data, which includes a CSS 911-6 and NSS 911-7. The departing port 201-2 of ND 201 is monitored. The monitoring comprises storing information about the test instance, setting up a timer of a predetermined value and removing the information about the test instance when a match is detected or the timer expires.

Figure 11:
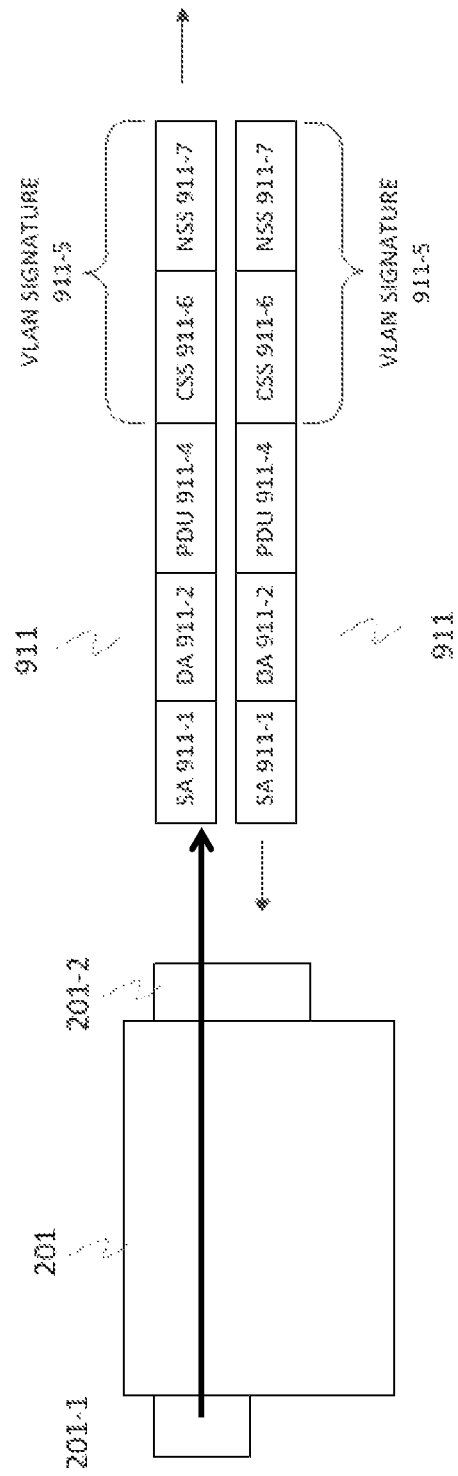
FIG. 11 is a diagrammatic illustration of the use of a beacon to detect an upstream service loopback.

Upstream service loopback is detected if the CSS of the originating frame matches the CSS of the returning frame. FIG. 11 shows the detection of upstream service loopback. In FIG. 11, an LPDB 911 is generated at port 201-1 and sent via port 201-2 to the network. Rules are sent by port 201-1 to port 201-2 to monitor the return of an LPDB 911, with the CSS 911-6 of the returning frame 911 matching the CSS of the originating frame, a downstream service loopback is detected. The monitoring includes storing information about the test instance and setting a timer. The information stored about the test instance is removed when a loopback is detected or the timer expires.

Similarly, downstream service loopback is detected if the CSS and NSS of the originating frame matches the CSS and NSS of the returning frame when the LPDB is sent downstream from port 201-1 and returns to port 201-1. In this case, the rules may be sent to port 201-2 in case the LPDB returns to that port which would indicate a misconfiguration and can raise an alarm.

In one embodiment, the monitoring processes to detect loopbacks as described above are implemented on the ND. In another embodiment, these monitoring processes are implemented on a separate device or server. In this case, the information about the test instance is stored on the separate device, and if an LPDB is received, its information or the LPDB itself is forwarded to the separate device for processing. Information about several received LPDB can be aggregated into one message between the ND and the separate device.

In one embodiment, the LPDB is generated by a customer using a software tool. In an additional embodiment, the tool is used to detect loopbacks and network loops; and determine the location of the loopbacks or network loops. The software tool includes a programmable interface that allows the user to configure the LPDB to their particular requirements, before the LPDB is generated. In one embodiment, this software tool is run on the ND. In a further embodiment, this software tool is run on a separate server or device.

In an embodiment, the LPDB is configured before generation depending on the network to be tested or the detection needs, that is, whether it is being used to detect a port, tunnel or service loopback or the filters and modifiers present in the rule information already in the configuration describing the forwarding path used for forwarding within the ND.

If a loopback is detected, then in one embodiment, affected traffic is discarded. In a further embodiment, future traffic is blocked at the port, by blocking the forwarding capabilities to and from the port. For the cases of port loopback, tunnel loopback and downstream service loopback, forwarding of traffic to the port is prevented. For the case of upstream service loopback, forwarding of traffic from the port is prevented. In one embodiment, this blocking is revertive. This means that after the loopback is removed, the blocking is removed automatically. In another embodiment, this blocking is non-revertive, that is, the operator has to remove the blocking manually.

In one embodiment, a network loop is detected using a network loop detection beacon (NLDB).

Figure 12:
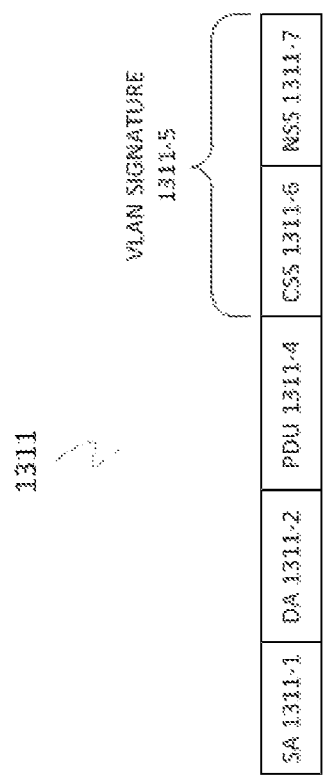
FIG. 12 is a diagrammatic illustration of a beacon used to detect a network loop.

An exemplary NLDB 1311 is shown in FIG. 12. This NLDB includes SA 1311-1, DA 1311-2, PDU 1311-4 and VLAN signature 1311-5. The VLAN signature 1311-5 includes CSS 1311-6 and NSS 1311-7.

Figure 13:
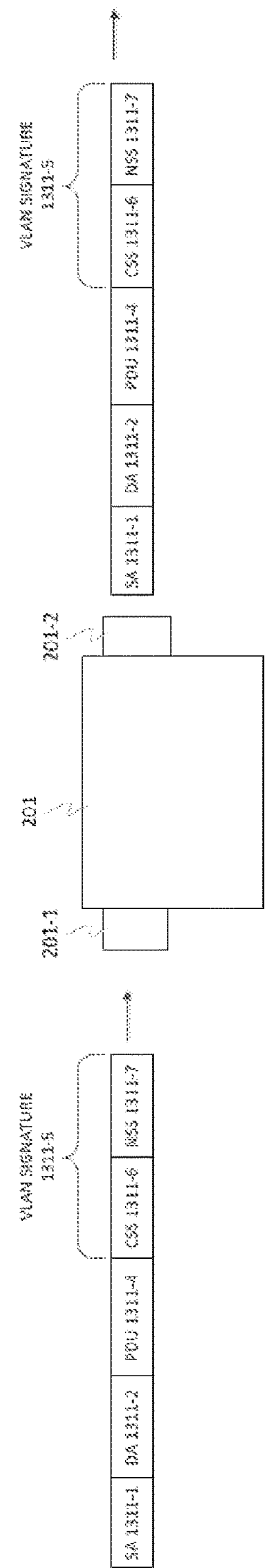
FIG. 13 is a diagrammatic illustration of the use of a beacon to detect a network loop.

In one embodiment, an NLDB is sent from a port of an originating device, such as an ND, into the network. FIG. 13 illustrates the NLDB 1311 being sent from port 201-2 of ND 201, which is the originating device. The port 201-2 is monitored. If the NLDB 1311 returns to ND 201 via a different port, such as port 201-1, the NLDB is forwarded to the originating port 201-2. If there is a match between the CSS 1311-6 and NSS 1311-7 of the returning NLDB and the CSS and NSS of the departing NLDB, then a network loop is detected. The monitoring comprises storing information about the test instance, setting up a timer of a predetermined value and removing the information about the test instance when a match is detected or the timer expires.

In one embodiment, the monitoring processes to detect network loops, as described above, are implemented on the ND. In another embodiment, these monitoring process are implemented on a separate device or server.

In one embodiment, the NLDB is generated by a customer using a software tool. The tool may be used to detect loopbacks and network loops, and to determine the location of the loopbacks or network loops. The software includes a programmable interface that allows the user to configure the NLDB to the user's particular requirements, before the NLDB is generated. The software tool may be run on the ND, or on a separate server or device.

The NLDB may be configured before generation based on the filters and modifiers present in the rule information used for forwarding within the ND.

If a network loop is detected on a port, traffic from that port may be discarded. Alternatively, traffic may be blocked from entering the port. This blocking may be revertive (which means that after the cause of the loopback is removed, the blocking is removed automatically), or non-revertive (which means the blocking has to be removed manually).

Alarms may be reported if a loopback or network loop is detected. If traffic is discarded, due to either loopbacks such as port or tunnel loopbacks being detected or a network loop being detected, then a critical alarm is reported.

The methods for testing for loopbacks can be generalized to a multiple-section network scenario, where different sections of the network are assigned different levels, and domains are created based on the levels. In one embodiment, each domain has a number, and the domain includes one or more sections either at the same level as the domain number or the levels below. For example, a domain number 2 includes all level 2 sections and level 1 sections. A domain number 4 includes all level 4, level 3, level 2 and level 1 sections.

Figure 14:
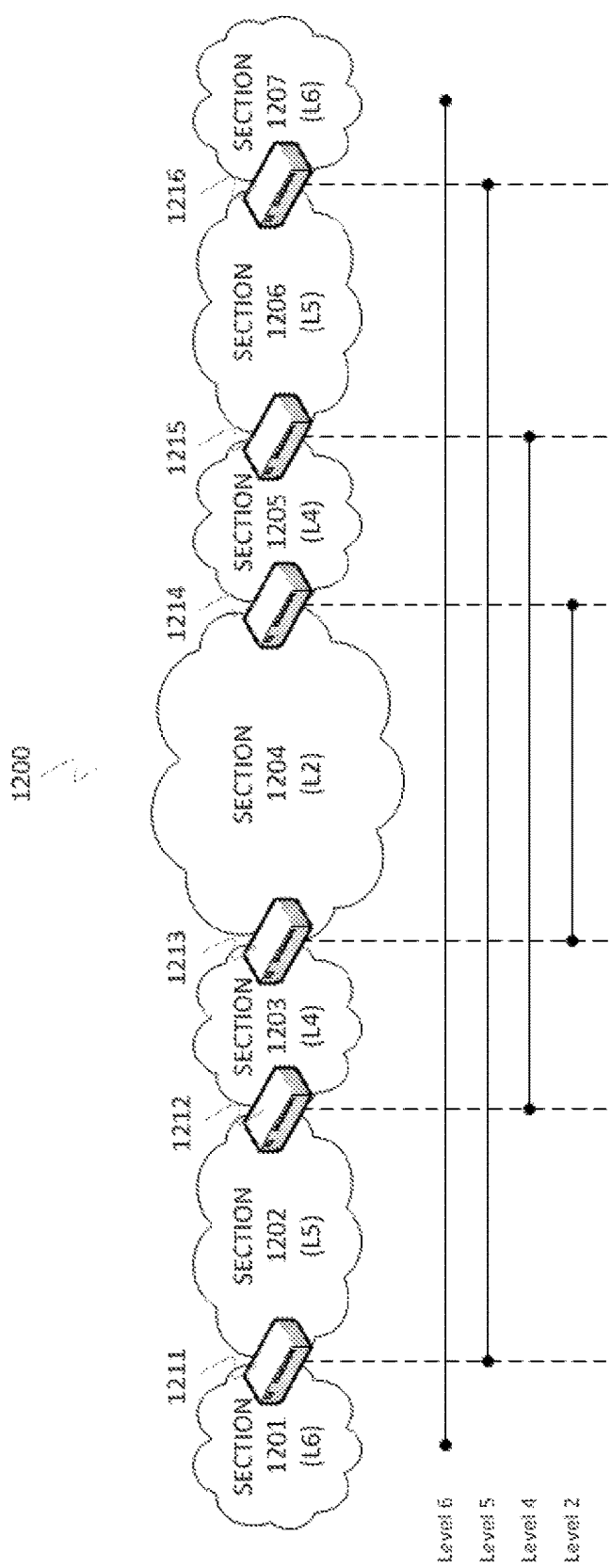
FIG. 14 is a diagrammatic illustration of a network with multiple sections and domain levels.

An exemplary multiple-section network 1200, with NDs 1211-1216 between each section, is shown in FIG. 14. Each section has a different level, as shown in Table 1:

TABLE 1

Section and level corresponding to each section for multiple-section network 1200

| Section | Level |
| --- | --- |
| 1201 | 6 |
| 1202 | 5 |
| 1203 | 4 |
| 1204 | 2 |
| 1205 | 4 |
| 1206 | 5 |
| 1207 | 6 |

The domain that each section belongs to is as shown in Table 2

TABLE 2

Domain to which each section belongs

| Domain | Sections |
| --- | --- |
| 6 | 1201, 1202, 1203, 1204, 1205, 1206, 1207 |
| 5 | 1202, 1203, 1204, 1205, 1206 |
| 4 | 1203, 1204, 1205 |
| 2 | 1204 |

In one embodiment, domain numbers are assigned to LPDBs as part of the LPDB configuration process. Based on the assigned domain numbers, LPDBs are restricted to one or more selected sections to test for loops within those sections. The restriction is specified within a forwarding rule at each ND at the interface to the next section. For example, with reference to the example above, an LPDB with a domain number 4 can only traverse sections 1203, 1204 and 1205, and is prevented, by a forwarding rule implemented within the NDs at the interfaces to section 1202 and 1206, from entering sections 1202 and 1206, which are level 5.

In a further embodiment, an equal flag is added to the LPDB domain number as part of the domain number assigning process, so that LPDBs are not forwarded outside sections with levels which do not have the same domain number. Referring to the example above, an LPDB with an equal flag and domain number 4 remains in either section 1203 or 1205, and cannot enter section 1202, 1204 or 1206.

It should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method of determining the presence of a tunnel loopback a multi-section network at a port, the method comprising:
    assigning a section level to each section of said multi-section network;
    assigning a unique domain number to one or more domains wherein one domain comprises one or more sections at the same section level and zero or more section at a lower section level;
    storing a protocol data unit (PDU) that includes a Virtual Local Area Network (VLAN) signature;
    sending a loopback detection beacon (LPDB) containing said PDU, a domain number and a time stamp;
    restricting said LPDB to one or more sections related to the domain number in the LPDB;
    determining whether a detected LPDB arriving at said port contains information corresponding to said stored PDU, to detect the presence of a loopback; and
    determining that said detected loopback is a tunnel loopback if said detected LPDB contains said VLAN signature and whether said detected loopback is a hard cable loopback or a remote facility loopback based on a difference between said time stamp and the arrival time of said detected LPDB.

2. The method of claim 1 wherein said restriction is done within a forwarding rule.

3. The method of claim 1 in which said detected loopback is a port loopback or a service loopback, and wherein said method includes determining whether said detected loopback is a port loopback or a service loopback.

4. The method of claim 1 in which said originating device is a network device.

5. The method of claim 1 in which said PDU is deleted if an LPDB arriving at said port and containing information corresponding to said PDU is not detected within said predetermined time period.

6. The method of claim 1 which includes determining whether a detected port loopback is a hard cable loopback or a facility loopback.

7. The method of claim 1 in which said detected loopback is determined to be a hard cable loopback if said difference is smaller than a predetermined threshold, and is determined to be a facility loopback if said difference is greater than said predetermined threshold.

8. The method of claim 3 in which said LPDB includes a Virtual Local Area Network (VLAN) signature that includes a Customer Service Specification (CSS) and a Network Service Specification (NSS), and wherein said method includes determining whether said detected loopback is a service loopback if (1) the CSS of an LPDB arriving at said port matches the CSS of an LPDB sent from said port, or (2) the NSS of an LPDB arriving at said port matches the NSS of an LPDB sent from said port.

9. The method of claim 1 in which the monitoring and determining are implemented on said originating device.

10. The method of claim 1 in which the monitoring and determining are implemented on a device or server separate from said originating device.

11. The method of claim 1 in which affected traffic is discarded in response to the detection of a loopback.

12. The method of claim 1 in which future traffic is blocked at said port in response to the detection of a loopback.

13. The method of claim 1 in which said LPDB is restricted to one or more selected sections of the one or more networks.

14. The method of claim 1 in which said LPDB is generated using a software tool.

15. The method of claim 1 in which said software tool is used to detect loopback based on said LPDB.

16. A system of determining the presence of a tunnel loopback a multi-section network at a port, the method comprising:
a section level assigned to each section of said multi-section network;
a unique domain number assigned to one or more domains wherein one domain comprises one or more sections at the same section level and zero or more section at a lower section level;
a protocol data unit (PDU) stored on a memory at the port, wherein said PDU includes a Virtual Local Area Network (VLAN) signature;
a loopback detection beacon (LPDB) containing said PDU, a domain number and a time stamp transmitted by said port into said network wherein said LPDB is restricted to one or more sections related to the domain number in the LPDB;
wherein said port receives said LPDB and determines whether a received LPDB contains information corresponding to said stored PDU, to detect the presence of a loopback;
and said port determines that said detected loopback is a tunnel loopback if said detected LPDB contains said VLAN signature and whether said detected loopback is a hard cable loopback or a remote facility loopback based on a difference between said time stamp and the arrival time of said detected LPDB.

17. The system of claim 16 wherein said restriction is done within a forwarding rule.

18. The system of claim 16 in which said detected loopback is a port loopback or a service loopback, and wherein said method includes determining whether said detected loopback is a port loopback or a service loopback.

* * * * *